United States Patent
Locatelli

(10) Patent No.: US 11,692,649 B2
(45) Date of Patent: Jul. 4, 2023

(54) CABLE ROUTING FASTENER

(71) Applicant: A. Raymond et Cie, Grenoble (FR)

(72) Inventor: Julien Locatelli, Rochester Hills, MI (US)

(73) Assignee: A. Raymond et Cie, Grenoble (FR)

( * ) Notice: Subject to any disclaimer, the term of this patent is extended or adjusted under 35 U.S.C. 154(b) by 0 days.

(21) Appl. No.: 17/395,644

(22) Filed: Aug. 6, 2021

(65) Prior Publication Data
US 2023/0042533 A1    Feb. 9, 2023

(51) Int. Cl.
| F16L 3/137 | (2006.01) |
| F16L 3/233 | (2006.01) |
| F16B 1/00  | (2006.01) |
| F16B 21/08 | (2006.01) |
| H02G 3/32  | (2006.01) |

(52) U.S. Cl.
CPC ............ *F16L 3/137* (2013.01); *F16B 1/0071* (2013.01); *F16B 21/086* (2013.01); *F16L 3/233* (2013.01); *H02G 3/32* (2013.01); *F16B 2001/0092* (2013.01)

(58) Field of Classification Search
CPC .......... F16L 3/137; F16B 21/08; F16B 21/082; F16B 21/086; F16L 3/233; H02G 3/30; H02G 3/32; F16B 1/0071; F16B 2001/0092; G09F 3/205
See application file for complete search history.

(56) References Cited

U.S. PATENT DOCUMENTS

| 5,971,330 | A   | * | 10/1999 | Noba et al. ............... | F16L 3/04 403/329 |
| 6,203,364 | B1  | * | 3/2001  | Chupak et al. ........ | H01R 13/73 439/571 |
| 6,269,573 | B1  | * | 8/2001  | Najmi ..................... | G09F 7/22 40/658 |
| 6,406,242 | B1  | * | 6/2002  | Gordon .................. | F16B 5/065 24/297 |
| 6,474,921 | B1  | * | 11/2002 | Gordon .................. | F16B 21/02 411/509 |
| 6,994,504 | B2  | * | 2/2006  | Gordon ................ | F16B 21/088 411/509 |
| 8,093,499 | B2  |   | 1/2012  | Hoffer et al. | |
| 8,763,212 | B2  | * | 7/2014  | Scroggie et al. ....... | F16B 5/0628 24/297 |
| 9,062,696 | B2  | * | 6/2015  | Demerath et al. ... | B60R 21/217 |
| 9,267,525 | B2  | * | 2/2016  | Everard .................. | F16B 21/02 |
| 9,568,299 | B2  | * | 2/2017  | Rhee ..................... | A47G 27/00 |
| 9,970,573 | B2  |   | 5/2018  | Beyer et al. | |
| 10,131,291 | B2 | * | 11/2018 | Ishida .................. | B60R 11/00 |

(Continued)

FOREIGN PATENT DOCUMENTS

| DE | 102004025698 A1 | 12/2005 |
| GB | 2537901 A | 11/2016 |

(Continued)

*Primary Examiner* — Jonathan Liu
*Assistant Examiner* — Guang H Guan
(74) *Attorney, Agent, or Firm* — Warner Norcross + Judd LLP

(57) ABSTRACT

A cable routing fastener includes a body and an arm extending therefrom, a head projecting from the body, a cover adjacent the arm so movement of the cover is temporarily restricted by the arm, and a cable connector. The body inserts into an aperture in a panel and positions the head and the cable connector adjacent the panel. The head includes an indicia element indicating an assembly status of the fastener, i.e., whether it is properly installed or not. The cover conceals the indicia element in a concealed mode, and moves relative to the head to an exposed mode so the indicia element is exposed for reading. The arm moves when the body is inserted so the arm no longer interferes with movement of the cover, so the cover can be moved by a user, transitioning from the concealed mode to the exposed mode. A related method of use is provided.

18 Claims, 4 Drawing Sheets

(56) References Cited

U.S. PATENT DOCUMENTS

| | | | |
|---|---|---|---|
| 10,396,512 B2 | 8/2019 | Gniadek | |
| 10,668,871 B2* | 6/2020 | Yon | B60R 13/0206 |
| 10,774,864 B2* | 9/2020 | Shinoda | B60R 13/0206 |
| 10,808,745 B1* | 10/2020 | Javali et al. | F16B 21/086 |
| 11,052,838 B2* | 7/2021 | Iwahara et al. | H02G 3/32 |
| 2008/0298925 A1* | 12/2008 | Shinozaki | F16B 19/1081 411/48 |
| 2013/0302087 A1 | 11/2013 | Binkert | |
| 2014/0056663 A1* | 2/2014 | Fukumoto | F16B 19/002 411/22 |
| 2021/0222717 A1* | 7/2021 | Yokoi et al. | F16B 5/0642 |
| 2021/0341002 A1* | 11/2021 | Lee et al. | F16B 21/086 |
| 2022/0045458 A1* | 2/2022 | Wu | F16B 21/02 |
| 2022/0099120 A1* | 3/2022 | Spearing | F16B 1/0071 |
| 2023/0042533 A1* | 2/2023 | Locatelli | G09F 3/205 |

FOREIGN PATENT DOCUMENTS

| | | |
|---|---|---|
| WO | 2013096544 A1 | 6/2013 |
| WO | 2017100391 A1 | 6/2017 |

* cited by examiner

CABLE ROUTING FASTENER

BACKGROUND OF THE INVENTION

The present invention relates to fasteners, and more particularly to cable routing fasteners having features that facilitate the confirmation of proper assembly or orientation of the cable routing fasteners relative to a structure to which the fasteners are attached.

In a variety of industries, cables and other elongated structures are routed through equipment, parts and other spaces. For example, in the automotive industry, a cable can be routed through a space within or adjacent a body panel, a floor panel, a dashboard, an engine bay or vehicle cabin from one location to another. Typically, the cable is secured in a fixed position and location within the space so it does not rub on or engage the panel or other parts within the space. To do so, many manufacturers and assemblers use a cable routing fastener so that part of the cable is retained by the fastener, and the fastener itself is further secured to the nearby panel. Multiple cable routing fasteners can be aligned with one another and mapped across one or more panels to selectively route the cable within the space.

A typical cable routing fastener has a head that projects from a base and a clip disposed opposite the head. The head can have a cable tie or clamp that directly engages and retains the cable, securing it to the base. The clip can be a canoe clip, pine tree clip, push pin or other structure that can project through a hole in a panel and adequately grip the panel to secure the cable routing fastener to the panel. As a result, the cable also is secured in a fixed position relative to the panel.

An issue with conventional cable routing fasteners is inadequate securement to the panel. In some cases, this can occur when the clip is not adequately engaged with the panel. For example, the clip can be partially inserted in a hole in the panel, but not sufficiently locked in the hole. After time, or upon further movement of the cable, the clip can disengage the hole, in which case the cable can separate from the panel and/or become improperly situated relative to other parts near the cable. In other cases, the cable routing fastener might not be oriented properly relative to the hole, and thus the panel, upon assembly to the panel. When this occurs, the improperly oriented cable can bind or kink, or generally not function properly. In yet other cases, the cable routing fastener might be broken if inserted in the hole or engaged with the panel incorrectly. In further cases, the cable routing fastener might only include a simple round clip which can spin or rotate in the hole. As a result, the cable can pivot or rotate about the hole, and thereby become improperly oriented relative to the space or other parts within the space. This can result in the cable being less than optimally routed.

When a cable routing fastener inadequately secures a cable to a panel or other structure, this defect might not be realized until well after assembly of the vehicle, machine or placement of nearby parts and structures. As a result, the cable routing fastener may be confined in a space that is difficult to access. Accordingly, to correct the defect or placement, parts near the fastener may need to be removed, which can consume time and cost money. Further, if the fastener fails while securing a critical cable, for example, one that operates a vehicle or machine, the function of that cable can be compromised. In turn, this could cause the machine or vehicle to malfunction, causing damage to the machine or vehicle, or injury to an operator thereof.

Accordingly, there remains room for improvement in the field of cable routing fasteners, and confirming that those fasteners are properly installed and ready to function.

SUMMARY OF THE INVENTION

A cable routing fastener includes a body, a head projecting from the body, a cover adjacent the body and oriented so movement of the cover relative to the head is temporarily restricted until the fastener is properly installed, and a cable connector. The head includes an indicia element indicating assembly status of the fastener, i.e., whether it is properly installed or not.

In one embodiment, the cover conceals the indicia element in a concealed mode, and moves relative to the head in an exposed mode so the indicia element is exposed for viewing or reading by a user. The body can be modified upon insertion in an aperture of a panel or other structure to free the cover so the cover can be moved and reveal the indicia element to confirm proper assembly and/or installation relative to the panel.

In another embodiment, the body can include an arm extending therefrom. The arm can be aligned with the cover so that the arm interferes movement of the cover to the exposed mode, exposing the indicia element, before the body is inserted in the aperture. When the body is adequately inserted in the aperture, the arm moves, so that it no longer interferes with movement of the cover to the exposed mode, in which the cover is disposed in a position to expose the indicia element.

In still another embodiment, the body can be shaped and configured to be inserted into an aperture defined by a panel. The body can position the head and cable connector adjacent the panel. The body, however, can sometimes inadequately engage the panel or aperture. This inadequate engagement can be monitored and/or indicated via the cover being convertible or not from the concealed mode to the exposed mode so that the indicia element is not exposed or exposed, respectively.

In yet another embodiment, the body or arm can restrict movement of the cover, thus limiting the exposure of the indicia element with the cover in a concealed mode. However, when the body is properly installed relative to the aperture and hole, the arm can move so the arm no longer interferes with movement of the cover. Accordingly, the cover can be moved by a user, transitioning from the concealed mode to the exposed mode.

In even another embodiment, the head can include the indicia element, which can be in the form of a bar code, such as QR codes, UPC codes, EAN codes, or an RFID tag, alphanumeric element, or other type of identifier, information or data storage articles. The indicia element can be readable by a human user, and/or by a reader, which can store, transmit and/or otherwise manipulate data or signals relating to the indicia element.

In a further embodiment, the head can include a plate to which the cover can be slidably mounted. The cover can be secured in positon to cover the indicia element before the cable routing fastener is positioned relative to the panel and aperture. In this manner, the indicia element cannot be read by a reader or user. After the fastener fully and properly is installed relative to the panel, however, the cover can be moved to expose the indicia element so that it can be read by a reader or user.

In still a further embodiment, a method of use is provided. The method can include: providing a cable routing fastener including a body, a head projecting from the body, a cover adjacent the body such that movement of the cover is restricted, and a cable connector extending from the head; inserting the body into an aperture defined by a panel so that movement of the cover is not restricted; and moving the cover relative to the head.

In yet a further embodiment, the method can include exposing an indicia element upon moving the cover relative to the head, the indicia element being concealed prior to the moving step; and reading the indicia element to confirm proper installation and/or assembly of the cable routing fastener relative to the panel.

In even a further embodiment, a cable can be installed and coupled relative to the head with the cable connector. The cable can be routed in a predetermined, consistent direction and orientation due to the proper assembly and installation of the cable routing fastener, which can be confirmed and logged into a memory or other storage media. The current embodiments provide an apparatus and method for efficiently and reproducibly confirming that a cable routing fastener is properly installed relative to a panel or other structure, and thus that a corresponding cable can be routed properly within a space or area near the fastener. The body or arm can restrict movement of the cover until the fastener is properly installed. Until then, the cover cannot be moved, and the indicia element can be concealed. Thus, a user cannot read the indicia element and thereby provide a false reading that the fastener is properly installed. The user can work to correct any deficiency, and install the fastener properly relative to the panel. Upon proper installation, however, the body or arm automatically moves to a condition that does not restrict movement of the cover. The user can, at that point, move the cover to expose and read the indicia element. With this cable routing fastener, a user can avoid improper installation relative to the panel. The cable joined with the fastener thus can be secured well in its position and/or orientation. The cable likely will not have to be later rerouted or fixed, nor will it interfere with other parts or components in the space in which it extends due to its proper attachment to the panel via the fastener. This can save resources, and avoid needless disassembly and reassembly of a vehicle, machine or equipment to address a loose, misaligned or misguided cable therein.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENT

Figure 1:
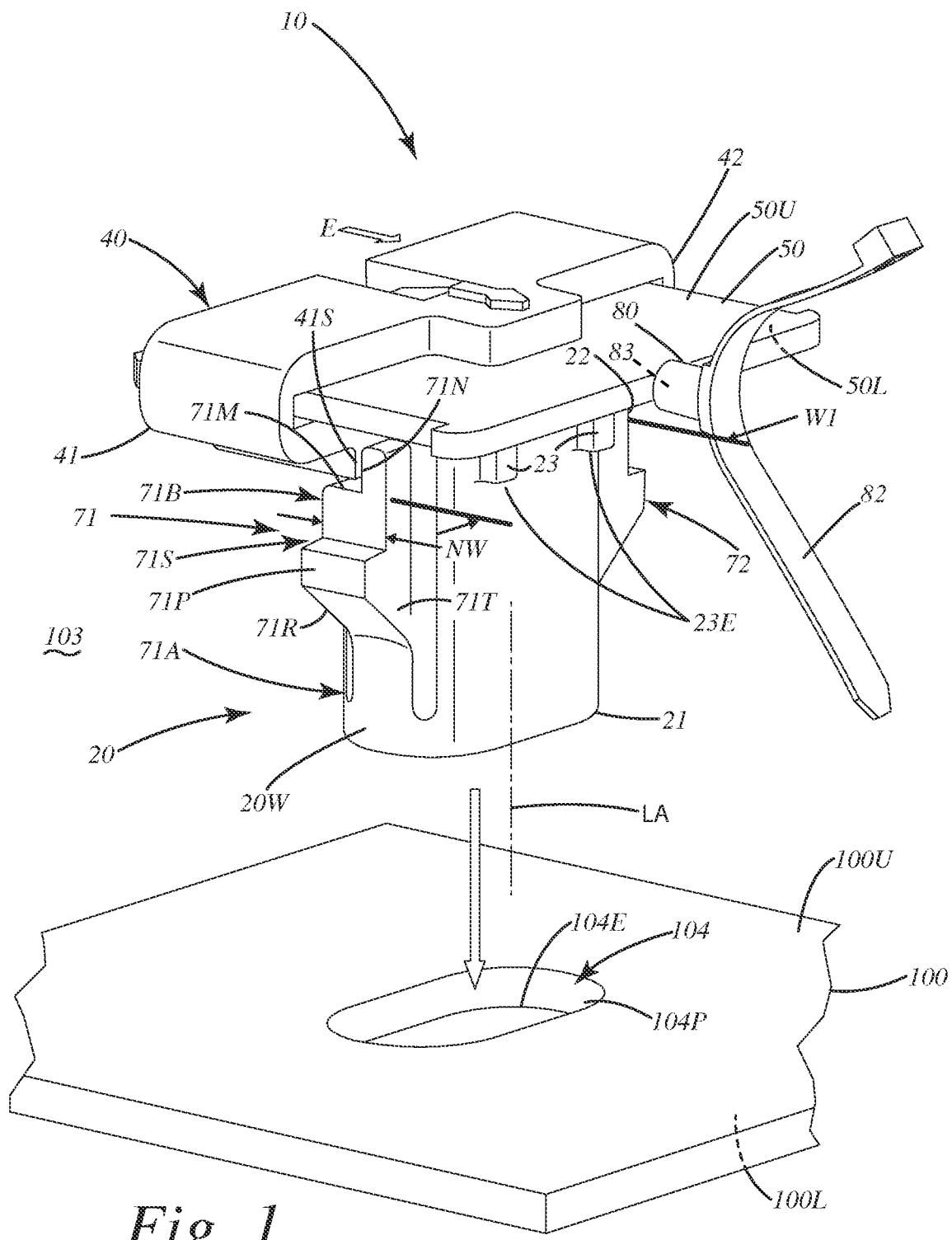
FIG. 1 is a perspective view of a cable routing fastener of a current embodiment where the cable routing fastener is about to be installed relative to an aperture in a panel.

A current embodiment of the cable routing fastener is shown in FIGS. 1-4 and generally designated 10. The fastener 10 generally is configured to mount a cable 102 relative to a panel 100 in a space 103. The fastener 10 can include a body 20, a head 50 projecting therefrom, and a cover 40 adjacent the body. A cable connector 80 can be used to connect the fastener 10 with the cable 102. The cover 40 can be moved from the position shown in FIG. 2 when the cover is in a concealed mode, to the position shown in FIG. 3, when the cover is in an exposed mode to expose an indicia element 60. In the concealed mode, movement of the cover 40 relative to the head 50 to the exposed mode is temporarily restricted, impaired or prevented (all referred to herein as restricted) by the body 20. Due to the position of the cover 40, the indicia element is concealed, not visible, or generally not readable by the user or an instrument or reader capable of reading the indicia element. This indicia element 60 can indicate the assembly status of the fastener 10, that is, whether it is properly assembled or installed or not, and thus whether attachment of the cable 102 to the panel 100 will likely succeed or not. The fastener 10 can be inserted into the aperture 104, which in turn can engage one or more portions of the body 20. As a result, when the fastener 10 and body 20 are fully and properly installed in the aperture relative to the panel 100 and/or assembled, the cover 40 is no longer restricted in movement. Accordingly, a user can move the cover relative to the head and/or the body to reveal the indicia element and confirm proper assembly and/or installation relative to the panel. The indicia element can be read by a reader, and the proper installation and/or assembly of the fastener 10 relative to the panel 100 can be recorded or otherwise input as data and stored in an associated storage media or memory.

As illustrated in FIG. 1, the panel 100 is shown as a sheet like member. It will be appreciated that, as used herein, a panel also can refer to any type of plate, pane, component, part, or other piece of a vehicle, machine, equipment, building or other structure. The panel 100 can be disposed adjacent a space 103, which as illustrated can be an open space without many other parts around it. Of course in some applications, such as where the panel is a body panel, such as an interior of a fender, door, floor or other body panel, the space 103 can be a small confined space, with other parts, components or elements of the vehicle projecting into the space. In these types of environments, the fastener 10 can assist in routing the cable through the space and among the different parts in an organized and clutter free manner.

The panel 100 can include or define an aperture 104. Although shown as a hole extending from an upper surface 100U to a lower surface 100L of the panel 100 and defined by a perimeter 104P, this aperture 104 can be formed or defined differently. For example, where the panel 100 is a part of a thicker, larger component, such as a chassis, a frame, an engine block, or even a thicker panel, the aperture 104 can be defined by that component and can extend downwardly into it, to a bottom. In such a configuration however, the perimeter 104P of the aperture 104 might include a shoulder or shelf that can interact with the body 20 to sufficiently actuate a portion of the body as described below so that such actuation translates to a disengagement or other modification of the fastener 10, which allows the cover 40 to move relative to the head or other portions of the fastener. Optionally, although the aperture 104 is shown as an elliptical shape, bounded by a correspondingly shaped perimeter 104P, the aperture 104 can come in a variety of shapes and sizes. For example, the aperture can be a circular, rectangular, square, polygonal, rounded or some other shape. Further, although the aperture 104 is shown as being bounded entirely by the perimeter 104P of the sheet 100, optionally, the aperture might be a recess, or an open aperture, which is open along one or more sides or regions such that the perimeter 104P is not continuous and includes ends that are separated from one another across an open gap. For example, the aperture can be of a channel or U-shape defined at an outer edge of the panel 100. Optionally, the body and fastener can be modified to accommodate this type of open aperture.

As mentioned above, the fastener 10 can include an indicia element 60. This indicia element can be in the form of a bar code, such as QR codes, UPC codes, EAN codes, or an RFID tag, alphanumeric element, or other type of identifiers, information conveyance elements or data storage articles. Where the indicia element 60 is in the form of an RFID tag, the fastener can include some additional shielding, for example, in the cover 40 and/or the head 50, to isolate and/or block the RFID tag so that it cannot be read when the cover is in the concealed mode. The indicia element can be visible and/or readable by a human user or a type of reader, which can store, transmit or otherwise manipulate signals relating to the indicia element. For example, the indicia elements can be read by a barcode reader and/or an RFID tag reader. The reader can capture, store, transmit and/or receive signals, information and/or data related to the indicia element when it is read. In some cases, the reader can be connected to a network, server, computer or other device that compiles a status checklist for assembly of one or more of the fasteners relative to one or more panels or other structures in a vehicle, machine or equipment. Unless and until the indicia element on a particular fastener is read, that fastener may be indicated on a display or other output as insufficiently installed relative to the panel. Optionally, in simpler manufacturing protocols, the indicia element can be a sticker that is colored or includes an alphanumeric element that a user visually observes before confirming that the fastener is adequately installed relative to the panel and/or the hole to ensure that the cable likewise can be properly installed to complete the assembly.

Figure 4:
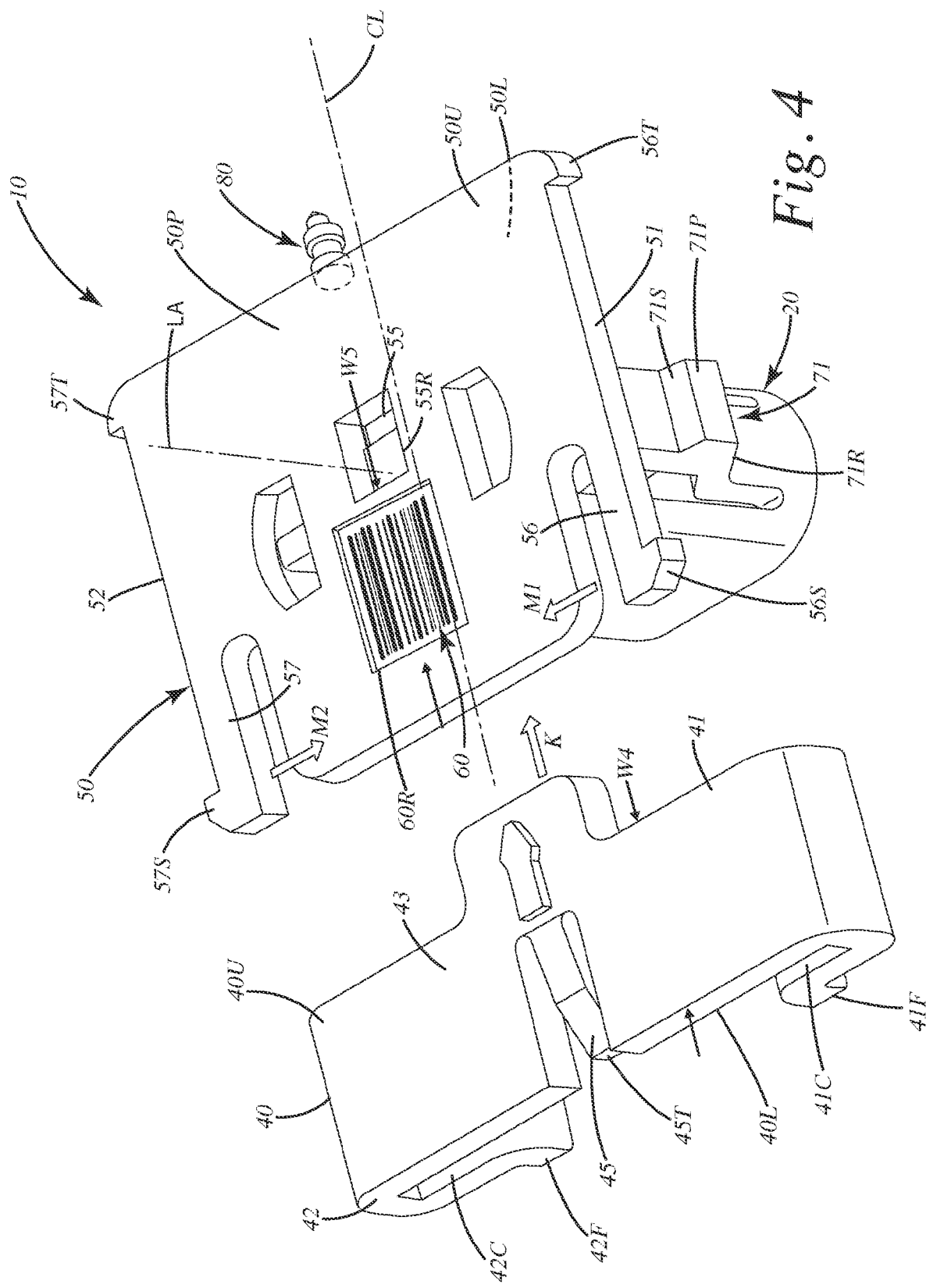
FIG. 4 is a perspective view of the cable routing fastener illustrating the cover being installed on a head thereof.

As illustrated in FIG. 4, the indicia element 60 can be joined with the head 50 of the fastener 10 in some applications. The head 50 optionally can define a recess 60R on the upper surface 50U of the head 50, which surface can be opposite a lower surface 50L of the head 50. The indicia element 60 can be in the form of a sticker or thin placard that is disposed in the recess so that its upper surface is flush with or below the upper surface 50U of the head 50. In this manner, the indicia element 60 is less likely to interfere with movement of the cover where the tolerances between the cover and the head are tight. Of course, in other applications, the indicia element 60 can be a barcode that is affixed to or engraved on the upper surface 50U of the head 50. The indicia element 60 as shown in FIG. 4 also can be positioned such that it does not occupy a significant portion of the upper surface 50U. This can be so that the cover 40 can be moved relative to the head 50 a relatively small distance, yet still uncover the indicia element 60. In some cases, the indicia element 60 can occupy optionally less than 50%, less than 40%, less than 30%, less than 20% or less than 10% of the upper surface 50U of the head 50. Optionally, in other applications, the indicia element can be secured to the head in another location, or to the body or other portion of the fastener. The cover can correspondingly be removably placed on or over the indicia element.

Turning now to the structure of the fastener 10, the body 20, head 50 and cover 40 will be described individually in more detail. To begin, the body 20 as shown in FIG. 1 can be a generally elongate structure having a shape that can correspond to and/or fit within the aperture 104, optionally following the shape and contour of the perimeter 104P of the aperture 104. The body also can define a longitudinal axis LA that extends generally centrally within the body 20. As shown, the body can have a tubular structure to minimize weight still provide a solid connection to the panel. In other applications, the body 20 can be a solid part. The body 20 can include an insertion end or first end 21 and a second end or distal end 22. The insertion end 21 can be sized, shaped and configured to pass into and/or at least partially through the aperture 104 of the panel 100. In the embodiment shown, the first end 21 can include dimensions that are slightly smaller than the hole 104 and in particular the perimeter 104P so that it can easily pass into and through the panel 100 when inserted. The distal end 22 can be configured to remain adjacent and/or outside the aperture.

Figure 2:
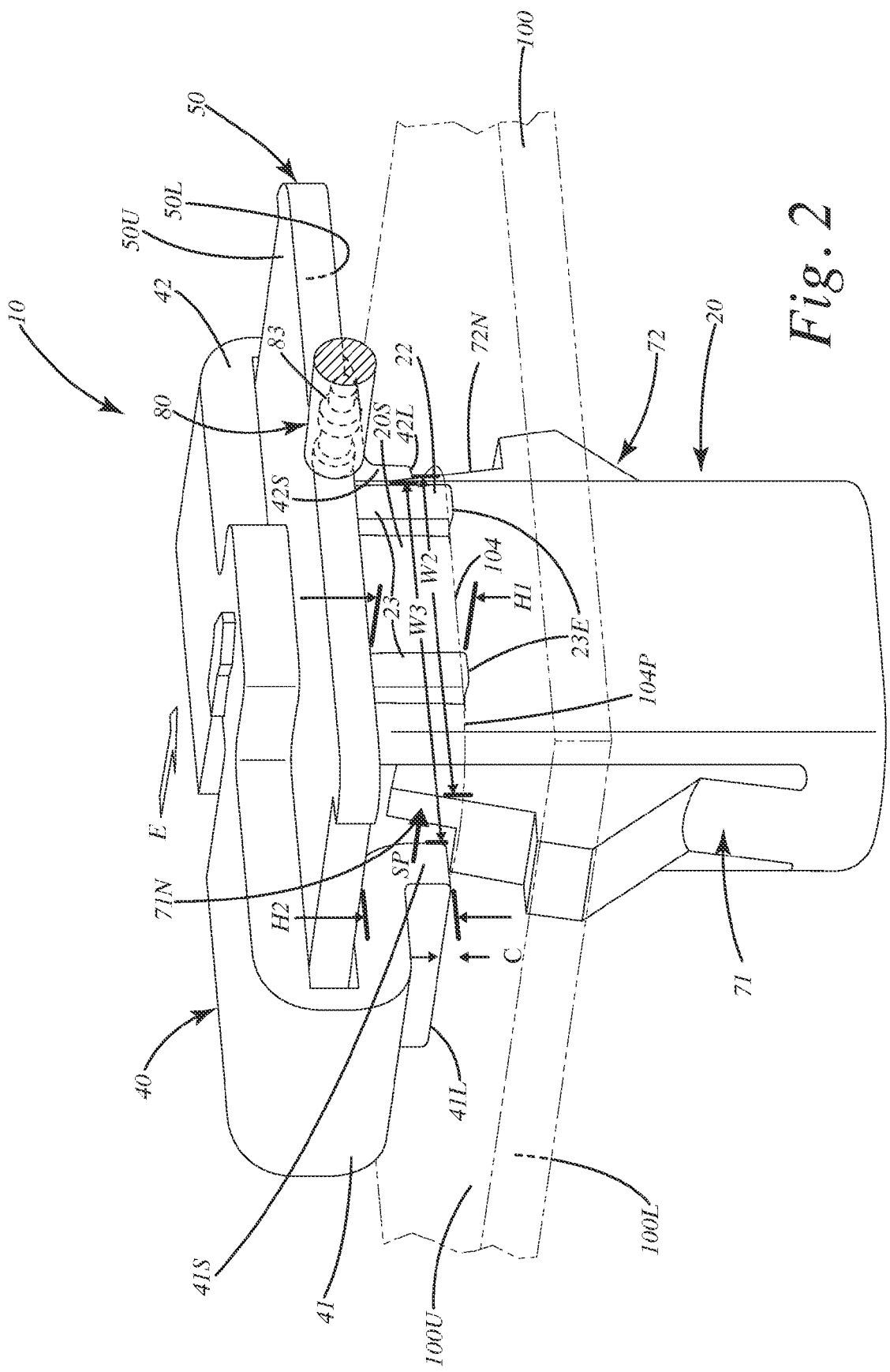
FIG. 2 is a perspective view of the cable routing fastener after it is installed relative to the panel, but before a cover of the fastener is converted from a concealed mode to an exposed mode.

Optionally, as shown in FIG. 2, the distal end 22 can remain above the upper surface 100U, or generally outside the aperture 104 of the panel 100. In some applications, the body and/or the head can include spacers 23 that extend along the second end 22. The spacers can include engagement surfaces 23E that directly engage the upper surface 100U of the panel 100. The spacers can ensure that the head 50, and in particular its lower surface 50L does not directly engage the upper surface 100U of the panel 100. The spacers can enable the arms 71 and 72, as well as the cover 40, to freely move when the body 20 is fully and properly installed in the aperture 104 as described below. As shown, these spacers 23 can project from a side surface or wall 20S of the body 20. Alternatively, they can project from the lower surface 50L of the head 50. The spacers optionally can be disposed on front and rear surfaces of the body 20. In alternative embodiments, the spacers can be in the form of a shoulder or lip that extends around the body 20 in preselected locations. In yet other applications, the spacers can be part of an extension of the head, with channels or grooves in which portions of the cover are received and move.

Optionally, as shown in FIG. 2, the spacers 23, and in particular the engagement surfaces 23E, can be disposed below the lower surface 50L of the head 50 a distance or height H1. This height H1 can be greater than or equal to a distance or height H2, which can be a distance below the lower surface 50L of the head 50 that lowermost portions 41L, 42L of respective wings 41, 42 of the cover 40 extend. Accordingly, with this height difference, the spacers can space the cover and the lowermost portions of the wings so that the cover does not directly engage the upper surface 100U or the panel 100 to impair or prevent movement of the cover when the fastener is properly and fully installed relative to the panel. As a result, the upper surface 100U and the panel 100 do not interfere with sliding motion of the cover 40 when it is transitioned from a concealed mode to an exposed mode as described below.

Optionally, the spacers 23 can be specifically spaced so that there is a small clearance C between the lowermost portion 41L, 42L of the wings and the panel 100. With this clearance, the panel 100 does not engage the cover substantially enough to reduce its ability to be slid or moved relative to the head 50 and/or the body 20. Further optionally, the spacers 23 can be configured to engage the upper surface 100U of the panel 100 adjacent the perimeter 104P of the aperture 104. In other applications, the spacers can be disposed outwardly and distal from the aperture.

Figure 3:
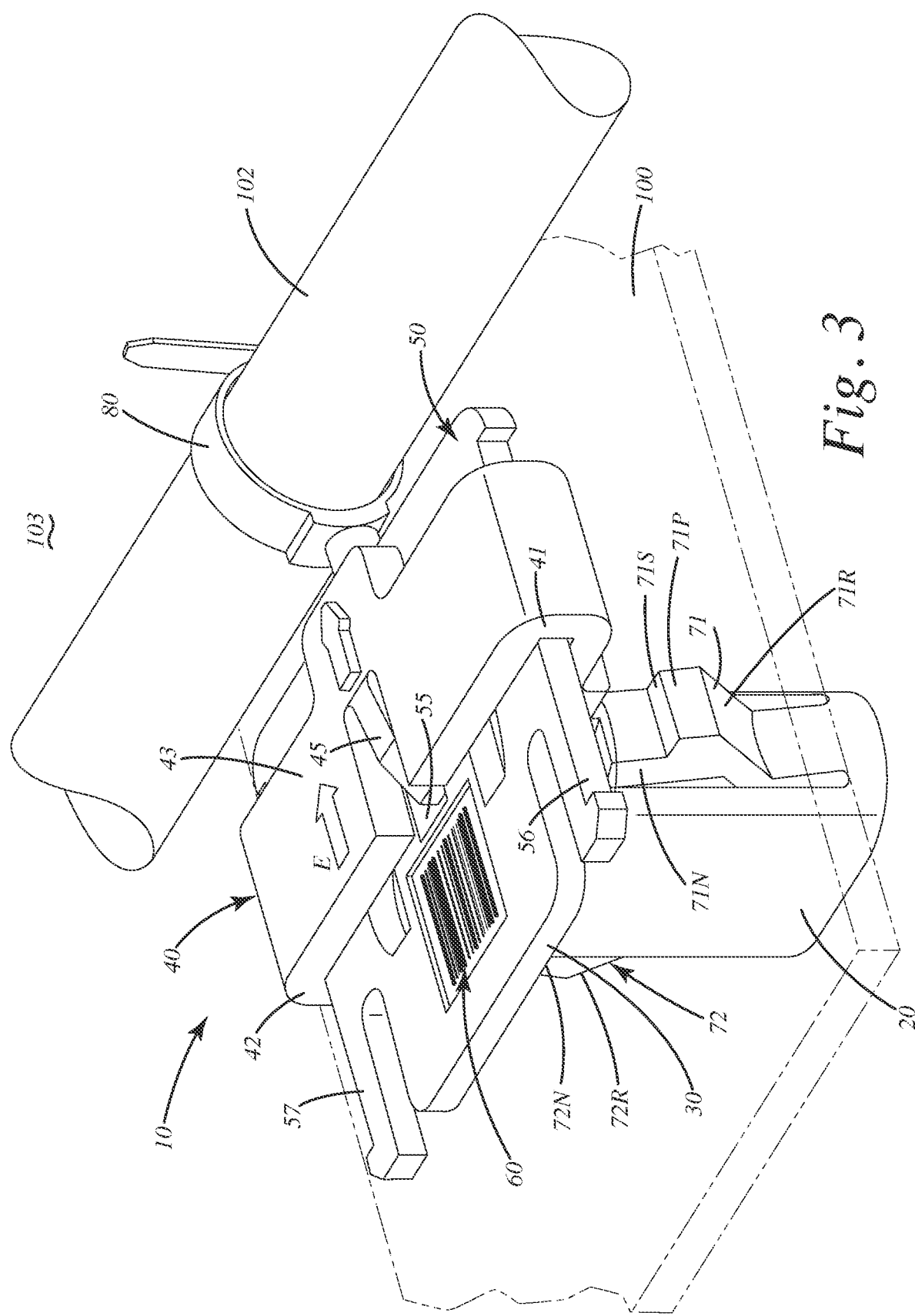
FIG. 3 is a perspective view of the cable routing fastener after it is installed relative to the panel, and after the cover is converted from a concealed mode to an exposed mode.

With reference to FIGS. 1-3, as noted above, the body 20 can include first and second arms 71 and 72. Because the first and second arms are generally identical, but disposed on opposite sides of the longitudinal axis LA, only the first arm 71 will be described in substantial detail here. The second arm 72 can include similar or identical structure and can operate and function similarly. The first arm can extend laterally away from the body 20, opposite the second arm 72. The first arm 71 can include a first end 71A that is joined with the body 20 and extends away from the insertion end 21 generally toward the distal end 22 of the body in a cantilevered manner. The first arm 71 can extend upward and away from the first end 71A toward a second arm end 71B that can be adjacent the distal end 22 of the body. The second end can be located adjacent or near the lower surface 50L of the head 50. The second end 71B of the arm can be disposed adjacent and/or near a portion of the cover 40, for example, a portion of the first wing 41 of the cover 40 which is opposite the second wing 42 of the cover 40 which itself selectively interfaces with second wing 72.

Optionally, as shown in FIGS. 1 and 4, the arm 71 can include multiple features, contours and shapes between the first end 71A and the second end 71B. In particular, the first arm 71 can include a ramp 71R that is closer to the insertion end 21 than a step 71S that is positioned along the arm distal from the ramp 71R. The ramp 71R can be shaped and of an outwardly tapered configuration that extends away from the outer lateral wall 20W of the body 20 as that ramp transitions from the insertion and toward the distal end 22. This tapered or angular ramp can be configured to ride along and frictionally engage the perimeter 104P of the aperture 104 when the body 20 is inserted into the aperture 104. As the ramp engages the perimeter 104P, the arm 71 can bend or flex, pivot, rotate or deform at a transition region 71T that is between the ramp 71R and the end 71A of the arm, or generally the body 20. Generally, the arms can transition from an extended mode shown in FIGS. 1 and 4, to a retracted mode, as shown in FIGS. 2 and 3.

The ramp 71R can transition to the step 71S as mentioned above. The step 71S and ramp can be separated by a flat arm portion 71P that is disposed therebetween. The arm 71 can be configured with the ramp and step such that after the body 20 is inserted sufficiently into the aperture 104 such that the ramp and any additional portion 71P adjacent the ramp passes by the perimeter 104, and beyond the lower edge 104E of the aperture 104, the arm 71 can resiliently bend back outward, away from the longitudinal axis such that the step 71S engages the perimeter. With this step engaging the perimeter, the arm effectively engages the lower surface 100L of the panel 100. The body and thus the fastener 10 are thus properly installed relative to the panel 100, with the step locked to the perimeter and holding the fastener 10 securely within the hole 104. In this configuration, the arm 71 can be in a retracted mode as noted below.

It will be appreciated that the step on the second arm 72 also can engage the lower surface 100L of the panel such that the first arm 71 and second arm 72, and the respective first and second steps of those arms, can secure the fastener relative to the panel. Again, when these arms and the steps are in such a position and configuration, the body 20 is fully inserted in and secured relative to the panel and the aperture. As a result, the fastener itself is properly and fully installed relative to the panel, and as described below, this results in the cover 40 being movable from the concealed mode to the exposed mode, and generally with the cable being properly and fully installed relative to the panel and within the space 103 adjacent the panel when connected thereto via the cable connector 80.

With further reference to FIG. 1, the arms 71 and 72 can cooperate with the cover 40 to impair, restrict and/or prevent (all referred to as restrict herein) the movement of the cover in direction E relative to the head 50. In particular, the distal end 71B of the arm 71 can be configured such that it includes an arm engagement surface 71N. This arm engagement surface 71N optionally can form a portion of a notch. The notch can be less than the overall width NW of the arm. The arm engagement surface can be configured to be placed in front of or near a first stop 41S of the first wing 41 of the cover 40. It will be appreciated that the second arm 72 of the body also can include a similarly configured distal end that likewise engages a similar second stop 42S of the second wing 42 of the cover 40. Again, the interaction of the first stop 41S and the arm 71 will be described here, noting that interaction of the second stop in the second arm can be virtually identical.

FIG. 1 illustrates the cover 40 in the above-mentioned concealed mode. In this mode, the cover generally is not movable and/or the cover movement is restricted by its engagement with the first arm 71. In particular, the first stop 41S can be engaged with the notch 71M of the distal end 71B of the arm 71. The stop 41S can directly engage and can be placed in close proximity to the arm engagement surface 71N. With the arm and engagement surface in this location, the arm and its engagement surface can interfere with movement of the stop along its stop pathway SP when a user attempts to move the cover 40 in direction E. Again, in this condition, the cover is in the concealed mode such that the indicia element 60 cannot be viewed or read by a user or device. In this condition as well, the first and second stops can selectively engage the first and second arms when those arms are in the extended mode shown in FIG. 1 to prevent the cover from transitioning from the concealed mode shown there to an exposed mode, for example, shown in FIG. 3. The cover or fastener in general is able to be transitioned to the exposed mode, when the stops 41S and 42S of the cover do not engage the first arm and the second arm. This can occur when the first arm and second arm are in the retracted mode shown in FIGS. 2 and 3. There, the cover can transition from the concealed mode or intermediate mode to the exposed mode to expose the indicia element 60. The first stop and the second stop also can be aligned with one another so that when the first arm and second arm are each in the retracted mode, for example, as shown in FIG. 2, the first stop and the second stop can travel along the pathway SP to clear the first arm and the second arm respectively, so the cover can transition to the exposed mode or generally move in the direction E as shown there.

Optionally, the first arm 71 and the second arm 72 can be spaced relative to one another to assist in securing and/or transitioning the cover in the concealed mode and the exposed mode. The first stop 41S and second stop 42S likewise can be configured and spaced relative to one another accordingly. The first arm 71 and the second arm 72, for example, at the outermost portion of the engagement surfaces 71N and 72N thereof can be spaced a first width W1 from one another when in an extended mode, as shown in FIG. 1. The first stop 41S and the second stop 42S can be disposed a third width W3 from one another. The first width can be greater than the third width as shown in FIG. 1 so that the arms interfere with movement of the cover from a concealed mode shown there. The arms also generally can be disposed along the stop pathway SP to restrict movement of the wings along the pathway.

When the arms are converted to a retracted mode shown in FIG. 2, however, the first arm and the second arm can be spaced a second width W2 from one another. This second width W2 can be less than the first width W1 of those arms as shown in FIG. 1. This second width W2 also can be less than the third width W3 as shown in FIG. 2. When the arms are in this condition, at width 2, which can be associated with a condition where the fastener is fully installed, and the arms are engaged at their steps with the perimeter edge 104P of the aperture 104, the engagement surfaces 71N and 72N are no longer obstructing the movement of the stops 41S and 42S along the pathway SP, and generally the wings or the cover 40. As a result, the cover 40 can be moved in direction E as shown in FIG. 3 so the cover can achieve the exposed mode shown there. With this exposed mode achieved, the indicia element 60 is exposed and able to be viewed and/or read by a user or device.

With reference to FIG. 2, the installed condition of the body 20 and the fastener 10 will be described. As shown there, the fastener 10 is fully and properly installed relative to the panel 100. In that condition, the spacers 23 can engage or otherwise be placed adjacent the upper surface 100U of the panel 100. The spacers can maintain the previously noted height H1 of the head 50 away from the upper surface 100U. As mentioned above, in this condition, the arms 71 and 72 also have been fully installed relative to the panel 100. As a result, the arm engagement surfaces 71N and 72N also are spaced and disposed at the narrower width W2 and no longer interfere with or restrict movement of the cover or the wings 41 and 42 relative to the arms 71, 72. As a result, a user can move the cover in direction E along a pathway such that the cover can achieve the exposed mode from the previously configured concealed mode.

Generally, a user can move the cover 40 to expose the indicia element 60 when the body 20 is properly installed in the aperture 104. In this condition, the arms 71, 72 are in their retracted mode to allow the stops of the cover to clear the respective arm engagement surfaces and move the cover 40 in direction E, with the stops moving along the pathways SP. A user cannot expose the indicia element 60 when the body 20 is improperly installed in the aperture. In this condition, the first arm 71 and/or the second arm 72 is not fully in a retracted mode. As a result, the first arm and the second arms, or portions of each, interfere with movement of the cover, obstructing the pathway SP of movement of the respective first and second stops, and the first and second wings of the cover. Thus, the cover cannot be moved, translated or transition to the extended mode.

With further reference to FIGS. 1 and 4, the cover 40 can include first 41 and second 42 wings that are disposed on opposite sides thereof. These wings can connect to a central plate 43. The central plate 43 can extend across the upper surface 50U of the head 50. In the closed mode, the central plate 43 can conceal substantially or completely the indicia element 60 disposed relative to the head 50 or the fastener 10 in general. The first wing 41 and second wing 42 can each define a respective channel or slot 41C and 42C. These channels or slots can be configured to extend over portions of the head 50, which optionally can include a plate 50P. The channels and the wings 41 and 42 can be disposed adjacent a first plate edge 51 and a second plate edge 52, respectively. The plate edges 51 and 52 can be slidably registered within the respective channels 41C and 42C of the cover 40 when the cover is installed relative to the head. The first and second wings 41 and 42 can wrap around the respective first and second opposing plate edges 51 and 52.

The channels and the wings can transition downwardly to lower flanges 41F and 42F which each respectively can include the stops 41S and 42S as described above. The cover 40 and central portion 43 can be a width W4 that can be greater than the width W5 of the indicia element 60 disposed atop the plate 50P. With these varying widths, the cover and central portion 43 completely or substantially cover the indicia element 60.

Optionally, the head 50 and cover 40 can lock relative to one another when the cover is in the exposed mode, after the cover 40 has been moved to expose the indicia element 60. For example, the head 50 can include a first lock 55 and the cover 40 can include a second lock 45 corresponding to the first lock 55. The second lock 45 can engage the first lock 55 when the cover 40 is in the exposed mode to secure the cover 40 in the exposed mode. In this manner, the indicia element can be read by or viewed by a reader or user. As shown in FIGS. 3-4, the second lock 45 can be in the form of a resilient arm with a tooth 45T that normally extends below a lower surface 40L of the cover 40. In this configuration, the second lock 45 and the tooth 45T can ride across the indicia element 60 and/or the plate 50P, and in some cases the upper surface 50U of the head 50. The arm 45 and tooth 45T, however, do not substantially interrupt or restrict movement of the cover 40 relative to the head 50, for example, when the cover 40 is transitioned from a concealed mode to an exposed mode. When the cover is fully transitioned to the exposed mode, however, the tooth 45T can enter into a recess 55R of the first lock 55. When this occurs, the tooth and arm of the second lock 45 can effectively lock the cover 40 in a fixed position relative to the head 50 and in particular the plate 50P. In this manner, the cover can remain locked in the exposed mode, exposing the indicia element 60 so that it provides a visual indication that a transition to the exposed mode has been achieved.

Further optionally, the head 50 can include first 56 and second 57 prongs. These can be disposed on opposite sides of the head, adjacent the respective first 51 and second 52 edges. The first prong 56 can include a first shoulder 56S and the second prong can include a second shoulder 57S. Each of the prongs can be resiliently deformed toward one another or generally toward a centerline CL of the fastener in directions M1 and M2 as shown in FIG. 4. As mentioned above, the cover 40 can include the first 41 and second 42 wings extending from the central portion 43. When the cover 40 is initially installed relative to the plate 50P of the head 50, these wings can compress the first and second prongs 56 and 57 toward one another or generally toward the centerline CL in respective direction M1 and M2 when the cover is being installed relative to the head. After the cover is fully installed relative to the head, the first and second prongs can bias away from one another and generally away from the centerline, in directions opposite M1 and M2. When this occurs, the shoulders 56S and 57S of the first 56 and second 57 prongs can effectively trap or restrain movement of the first 41 and second 42 wings and the cover 40 on the head 50. The head also optionally can include secondary shoulders 56T and 57T that are distal from the respective shoulders 56S and 57S. In this manner, the wings 41 and 42 can be effectively slidably trapped between the respective shoulders on each side of the head.

The wings optionally can slide relative to the opposing first 51 and second 52 opposing edges of the plate 50P. When this occurs, the edges 51 and 52 move relative to the respective channels 41C and 42C of the respective wings 41 and 42. Optionally, after the cover 40 is fully installed relative to the head, the prongs 56 and 57 return to their normal extended condition as shown in FIG. 4, but still maintain the cover trapped relative to the head.

As mentioned above, the fastener 10 can include a cable connector 80. This cable connector can be in the form of a cable tie as shown in FIGS. 1 and 3. The cable connector alternatively can be in the form of a clamp, C-clip, hook and loop strap, tape strap, band or other structure to connect the cable 102 to the fastener. The cable connector can include a swivel post 83, to which a tie 82 can be pivotally joined. In other applications, the cable connector can be void of a swivel. Although shown as projecting from the plate, the cable connector can extend from the body, or in some limited applications, might be joined with a part of the cover or can interface with the cover. A variety of other cable connectors are contemplated.

A method of using the cable routing apparatus 10 of the current embodiment will now be briefly described here. The method can generally include providing a cable routing fastener including a body, a head projecting from the body, a cover adjacent the body such that movement of the cover is restricted, and a cable connector extending from the head; inserting the body into an aperture defined by a panel such that movement of the cover is not restricted; and moving the cover relative to the head along a path of movement.

Referring more particularly to FIG. 4, the method can include installing a cover 40 relative to a head 50 of the fastener 10. The cover 40 can be moved in direction K, with the wings 41 and 42 aligned with respective first prong 56 and second prong 57, and/or the edges 51 and 52. The prongs can be biased in directions M1 and M2 so that the shoulders 56S and 57S and side edges enter the respective channels 41C and 42C. The cover can continue to move in direction K so that it covers the indicia element 60 atop the head 50. The wings 41 and 42 can clear the respective shoulders 56S and 57S so that the cover is effectively trapped between those shoulders and the respective secondary shoulders 56T and 57T.

The cover 40 also can be restrained from further movement due to the interaction of the first stop 41S and second stop 42S with the respective first arm 71 and second arm 72 as described above. With the cover fully installed, it is maintained in a concealed mode, in which it conceals the indicia element 60 so that the indicia element is not visible or readable by a user or reader.

With the cover 40 assembled relative to the head 50 and the body 20, the fastener 10 can be aligned with the aperture 104. The body 20 and the insertion end 21 can be inserted into the aperture 104 passing by the perimeter 104P of the aperture. The head can move downward toward the upper surface 100U of the panel 100. During this insertion, the perimeter 104P can engage the respective arms 71 and 72 and convert them from an extended position to a retracted position, assuming the installation is done properly and completely. If it is not, then the arms do not adequately move and transition completely from the extended mode to the retracted mode. In this case, the arms continue to restrict movement of the cover so that it cannot be converted from the concealed mode to the exposed mode.

Assuming the arms are adequately engaged with the panel, for example, with the steps 71S and 72S engaging the perimeter 104P adequately to secure the body within the aperture and to the panel 100, the engagement surfaces 71N and 72N can thus move out of the pathway SP of movement of the stops 41S and 42S. This can thus effectively ensure that the body has been properly installed relative to the panel. Optionally, the spacers 23 also can ensure that the wings have adequate clearance above the panels to still be moved by user.

With the fastener 10 properly installed relative to the panel, a user can then move the cover 40 in direction E. Of course, if the cover 40 cannot move, the user will know that the fastener is not properly assembled or installed, and can make adequate adjustments such that it is, and the arms properly move to allow the cover to move. With the cover being movable, it can be moved fully in direction E to the position shown in FIG. 3. In doing so it transitions from the concealed mode to the exposed mode shown there. In this exposed mode, the indicia element 60 can be exposed. Previously, the indicia element was concealed before this movement of the cover 40. The indicia element then can be viewed or read by the user or a device to confirm proper installation of the cable routing fastener 10 relative to the panel 100. The data associated with this reading or viewing can be transmitted to, logged, recorded, uploaded and/or sent to a computer, network, server or other storage medium or device to confirm the proper installation of the fastener 10. With the fastener 10 properly installed, a user can use the cable connector 80, which again can be a zip tie, clip, hook and loop fastener, clamp, C-clip, cord, band, or other type of fastener to secure the cable 102 to the fastener in the predetermined location dictated by the fastener. With this activity complete, the cable 102 can extend in a proper orientation configuration within the space 103 adjacent the panel 100.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

The invention claimed is:

1. A cable routing fastener comprising:
   a body configured to be inserted through an aperture in a panel, the body including a longitudinal axis, the body including a first arm resiliently extending therefrom, the first arm configured to engage a perimeter of the aperture of the panel to transition from an extended mode to a retracted mode so that the first arm is closer to the longitudinal axis;
   a head joined with the body and extending outward therefrom so that when the body is inserted in the aperture, the head extends adjacent the panel, the head including an indicia element configured to indicate an assembly status of the cable routing fastener;
   a cable connector joined with the head and configured to secure a cable to the body; and
   a cover joined with the head and disposed over the indicia element in a concealed mode, the cover moveable relative to the head to an exposed mode so that the indicia element is exposed, the cover including a first stop that selectively engages the first arm when the first arm is in the extended mode to prevent the cover from transitioning to the exposed mode, but the first stop does not engage the first arm when the first arm is in the retracted mode so that the cover is configured to transition to the exposed mode to expose the indicia element;
   whereby the first arm in the retracted mode allows moving the cover to expose the indicia element, and the first arm interferes with movement of the cover in the extended mode.

2. The cable routing fastener of claim 1 comprising:
   a second arm resiliently extending from the body opposite the first arm outward from the longitudinal axis, the second arm configured to engage the perimeter of the aperture of the panel distal from the first arm,
   wherein the second arm transitions from an extended mode to a retracted mode when the second arm engages the perimeter so that the second arm is closer to the longitudinal axis in the retracted mode,
   wherein the cover includes a second stop distal from the first stop, the second stop selectively engaging the second arm when the second arm is in the extended mode to prevent the cover from transitioning to the exposed mode, but the second stop does not engage the second arm when the second arm is in the retracted mode so that the cover is configured to transition to the exposed mode to expose the indicia element.

3. The cable routing fastener of claim 2,
   wherein the first stop and the second stop are aligned with one another so that when the first arm and the second arm are each in the retracted mode, the first stop and the second stop clear the first arm and the second arm respectively so that the cover is configured to transition to the exposed mode.

4. The cable routing fastener of claim 2,
   wherein the first arm and the second arm are spaced a first width from one another when in the extended mode,
   wherein the first arm and the second arm are spaced a second width from one another when in the retracted mode,
   wherein the second width is less than the first width.

5. The cable routing fastener of claim 4,
   wherein the first stop and the second stop are disposed at a third width from one another,
   wherein the third width is greater than the second width,
   wherein the third width is less than the first width.

6. The cable routing fastener of claim 1,
   wherein the head includes a first lock,
   wherein the cover includes a second lock corresponding to the first lock,
   wherein the second lock engages the first lock when the cover is in the exposed mode to secure the cover in the exposed mode so that the indicia element is configured to be read by a reader.

7. The cable routing fastener of claim 1,
   wherein the head includes a plate disposed orthogonal relative to the longitudinal axis of the body, the plate including a first plate edge and an opposing second plate edge,
   wherein the cover includes a first wing and a second wing, the first wing wrapping around the first plate edge, the second wing wrapping around the opposing second plate edge.

8. The cable routing fastener of claim 7,
   wherein the first wing extends to the first stop,
   wherein the second wing extends to a second stop configured to selectively engage a second arm extending from the body,
   wherein the first stop engages the first arm when the first arm is in the extended mode,
   wherein the second stop engages the second arm when the second arm is in an extended mode,
   whereby movement of the cover is prevented such that the indicia element cannot be read to confirm proper installation of the cable routing fastener relative to the panel when at least one of the first arm and the second arm is in the extended mode.

9. The cable routing fastener of claim 1,
   wherein the head includes a plate edge,
   wherein the cover includes a wing that wraps around the plate edge, wherein the wing extends to the first stop, wherein the first stop engages the first arm when the first arm is in the extended mode, thereby preventing movement of the cover such that the indicia element cannot be read to confirm proper installation of the cable routing fastener relative to the panel.

10. The cable routing fastener of claim 1, wherein the head includes a first prong and a second prong, the first prong and the second prong disposed on opposite sides of the head, the first and second prongs each including a shoulder at an end thereof, wherein the first and second prongs are resiliently deformable toward one another.

11. The cable routing fastener of claim 10, wherein the cover includes a first wing and a second wing, the first wing and the second wing extending from a central portion, wherein the first wing and the second wing are configured to compress the first prong and the second prong, respectively, toward one another when the cover is being installed relative to the head, wherein the first and second prongs are configured to bias away from one another when the cover is fully installed relative to the head, such that the shoulders of the first and second prongs trap the first and second wings on the head.

12. A cable routing fastener comprising:

a body configured to secure to a panel through a panel aperture;

a head extending from the body and including a cable connector and an indicia element that is configured to indicate a status of assembly of the cable routing fastener relative to the panel;

a cover moveably mounted to the head and operable in a concealed mode in which the indicia element is concealed, and an exposed mode in which the indicia element is exposed, wherein the body includes a resilient first arm configured to engage a perimeter of the panel aperture, and to transition from an extended mode to a retracted mode, wherein the cover includes a first stop that selectively engages the first arm when the first arm is in the extended mode to prevent the cover from transitioning to the exposed mode, but the first stop does not engage the first arm when the first arm is in the retracted mode so that the cover is configured to transition to the exposed mode to expose the indicia element, wherein the first arm in the retracted mode allows moving the cover to expose the indicia element, and the first arm interferes with movement of the cover in the extended mode.

13. The cable routing fastener of claim 12, wherein the head includes a plate having a first edge and an opposing second edge, wherein the plate includes a first prong and a second prong disposed adjacent the first edge and the second edge, respectively, wherein the first prong and the second prong engage the cover to restrain movement of the cover relative to the head.

14. The cable routing fastener of claim 13, wherein the plate includes a first shoulder and a second shoulder, wherein the first shoulder is distal from the first prong along the first edge, wherein the second shoulder is distal from the second prong along the second edge, wherein the cover is slidable between the first prong and the first shoulder along the head, wherein the cover is slidable between the second prong and the second shoulder along the head.

15. The cable routing fastener of claim 14, wherein the first arm engages the cover to impair sliding of the cover relative to the head when the cover is in the concealed mode.

16. The cable routing fastener of claim 12 comprising:

a lock prong joined with the cover; and a lock recess joined with the head, wherein the lock prong enters the lock recess when the cover is moved from the concealed mode concealing the indicia element to the exposed mode exposing the indicia element.

17. The cable routing fastener of claim 12, wherein the body includes an insertion end configured to pass into the panel aperture, and a distal end configured to remain outside the panel aperture, wherein the first arm includes a first end, which is joined with the body and extends away from the insertion end toward the distal end, and a second end adjacent the distal end, wherein the first arm includes a ramp adjacent a step, the ramp closer to the insertion end than the step, the ramp configured to ride along the perimeter of the panel aperture to move the first arm toward a longitudinal axis of the body, the step configured to engage the perimeter of the panel aperture after the ramp passes by the perimeter to hold the distal end closer to the body than before the body is inserted into the panel aperture, wherein the first arm engages the cover in the concealed mode, but moves closer to the body after the ramp passes by the perimeter of the panel aperture.

18. The cable routing fastener of claim 12, wherein the first arm includes a first surface at a distal end thereof, wherein the first surface interferes with movement of the cover in the concealed mode, wherein the first surface is moveable toward the body so that the first surface does not interfere with movement of the cover in the exposed mode.

* * * * *